United States Patent [19]

Hoshimoto et al.

[11] Patent Number: 5,245,112
[45] Date of Patent: Sep. 14, 1993

[54] METHOD FOR DECOMPOSITION OF CHLOROFLUOROCARBONS

[75] Inventors: Koji Hoshimoto, 2-25-5, Shogen, Izumi-ku, Sendai-shi, Miyagi; Akihito Hirota; Hiroki Habazaki; Asahi Kawashima; Katsuhiko Asami, all of Sendai, Japan

[73] Assignees: Koji Hashimoto, Sendai; Yoshida Kogyo K.K., Tokyo, both of Japan

[21] Appl. No.: 867,127

[22] Filed: Apr. 10, 1992

Related U.S. Application Data

[62] Division of Ser. No. 758,851, Sep. 12, 1991, abandoned.

[30] Foreign Application Priority Data

Sep. 13, 1990 [JP] Japan .................................. 2-241187

[51] Int. Cl.$^5$ ............................................. B01D 53/36
[52] U.S. Cl. .................................... 588/206; 588/213; 423/240 S
[58] Field of Search ............... 423/245.2, 240 R, 240 S, 423/DIG. 20; 588/206, 208, 213; 148/403

[56] References Cited

U.S. PATENT DOCUMENTS 4,957,717  9/1990  Imamura et al. ................. 423/240 S
4,997,632  3/1991  Radewald ....................... 423/240 R

FOREIGN PATENT DOCUMENTS 56-112436  9/1981  Japan ...................... 148/403
3-106419   5/1991  Japan ...................... 423/240 S Primary Examiner—Michael Lewis
Assistant Examiner—Stuart L. Hendrickson
Attorney, Agent, or Firm—Flynn, Thiel, Boutell & Tanis

[57] ABSTRACT

The present invention provides a method for the decomposition of chlorofluorocarbons to hydrofluoric acid, hydrochloric acid and carbon dioxide by the chlorofluorocarbons' reaction with water at a temperature of 200° C. or higher and in the presence of a catalyst material consisting of a metal selected from the group consisting of Ti, Zr, Nb and an alloy consisting of at least two elements selected from the same group. The catalyst material may also be composed of an alloy consisting of up to 80 atomic % of at least one element selected from the group consisting of Ni and Co and the substantial balance of being at least one element selected from the group consisting of Ti, Zr and Nb. The metallic catalyst materials of the present invention have a very high catalytic activity for the decomposition of flons at relatively low temperatures and can retain their high activity during the decomposition process, even if they are converted into fluorides.

3 Claims, 1 Drawing Sheet

METHOD FOR DECOMPOSITION OF CHLOROFLUOROCARBONS

This is a division of Ser. No. 07/758,851, filed Sep. 12, 1991, now abandoned.

BACKGROUND OF THE INVENTION

1. Field of the Invention

The present invention relates to metallic materials useful as highly active catalysts by which used spent chlorofluorocarbons (hereinafter referred to as "flons") can be easily decomposed to carbon dioxide, hydrofluoric acid and hydrochloric acid for purification or reuse thereof and which can retain their high activity, even if hydrofluoric acid and hydrochloric acid, which attack metallic materials, are produced by decomposition of the flons.

2. Description of the Prior Art

Since flons destroy ozonosphere, spent flons must be decomposed for purification. Decomposition of flons has heretofore been attempted by several methods, for example, by mixing flons with a large amount of methane to cause combustion, by the reaction of flons with water under high-temperature and high-pressure conditions, by the reaction of flons with water using zeolite as a catalyst, etc.

The present Inventors have conducted detailed studies and directed their attention to amorphous alloys which can contain large amounts of various elements having different properties. As a result, various kinds of amorphous alloys having properties desirable as catalysts for electrodes have been found. Based on the inventors' previous studies on such amorphous alloy catalysts for electrodes, two of the present inventors have further investigated catalysts for production of hydrofluoric acid, hydrochloric acid and carbon dioxide by the reaction of flons with water at low temperatures and found that highly active catalysts can be obtained from certain amorphous alloys, as shown in Japanese Patent Application No. 2-45661. The Japanese Patent Application is directed to the following three aspects:

1. Amorphous alloy catalysts for decomposition of flons characterized by being immersed in hydrofluoric acids for activation and consisting of 20 to 70 at % of at least one element selected from the group consisting of Nb and Ta, 0.5 to 20 at % of at least one element selected from the group consisting of Ru, Rh, Pd, Pt, and Ir, and the substantial balance being at least one element selected from the group consisting of Ni and Co.

2. Amorphous alloy catalysts for decomposition of flons characterized by being immersed in hydrofluoric acids for activation and consisting of 20 to 80 at % of at least one element selected from the group consisting of Ti and Zr, 0.5 to 20 at % of at least one element selected from the group consisting or Ru, Rh, Pd, Pt and Ir, and the substantial balance being 10 at % or more of at least one element selected from the group consisting of Ni and Co.

3 Amorphous alloy catalysts for decomposition of flons characterized by being immersed in hydrofluoric acids for activation and consisting of 20 to 80 at % in total of at least one element selected from the group consisting of Ti and Zr and at most 70 at % of at least one element selected from the group consisting of Nb and Ta, 0.5 to 20 at % of at least one element selected from the group consisting of Ru, Rh, Pd, Pt and Ir, and the substantial balance being 10 at % or more of at least one element selected from the group consisting of Ni and Co.

Since the reaction of flons with oxygen is an endothermic reaction, flons should be mixed with a large amount of methane for decomposition thereof by combustion. Therefore, this decomposition process is impractical. On the other hand, in the direct reaction of flons with water, the reaction must be carried out under the conditions of high-temperature and high-pressure. In order to decompose flons with a reduced consumption of energy, the reaction of flons with water should be carried out at low temperatures, using a catalyst. However, catalysts exhibiting superior performance in the reaction have not been found. Since the decomposition of flons by the reaction with water produces hydrofluoric acid and hydrochloric acid, besides carbon dioxide, metallic catalysts used for the decomposition are readily deactivated due to attack by these halogen acids.

Therefore, catalysts having a high activity and a high resistance against the foregoing halogen acids have been strongly demanded.

SUMMARY OF THE INVENTION

It is an object of the present invention to provide highly active metallic catalyst materials suitable for the decomposition of flons by which spent flons can be converted to carbon dioxide, hydrofluoric acid and hydrochloric acid by reacting with water at low temperatures.

It is a further object of the present invention to provide highly active metallic catalyst materials having a high resistance against halogen acids formed during the decomposition of flons.

The present inventors further investigated the catalysts for the production of hydrofluoric acid, hydrochloric acid and carbon dioxide by the reaction of flons with water at low temperatures, based on previous studies on catalysts including amorphous alloy catalysts for electrodes, and found that catalyst materials having a high performance and a high stability sufficient to withstand attack by halogen acids resulting from the decomposition of flons can be obtained from metals or alloys other than the amorphous alloys disclosed in Japanese Patent Application No. 2-45661. The new catalyst materials are not necessarily required to be amorphous. This invention was reached on the basis of such a finding.

The present invention provides a catalyst material for the decomposition of flons which consists of a metal selected from the group consisting of Ti, Zr and Nb, or an alloy consisting of at least two elements selected from the same group.

In a further aspect of the present invention, there is provided a catalyst material for the decomposition of flons which consists of an alloy consisting of up to 80 at % of at least one element selected from the group consisting of Ni and Co, the balance being substantially at least one element selected from the group consisting of Ti, Zr and Nb.

The present invention is also directed to a method for the decomposition of flons using the catalyst materials as specified above.

BRIEF DESCRIPTION OF THE DRAWING

The single FIGURE shows a cross section schematically illustrating an example of an apparatus for preparing metallic catalyst materials of the present invention.

DETAILED DESCRIPTION OF THE PREFERRED EMBODIMENTS

Figure 1:
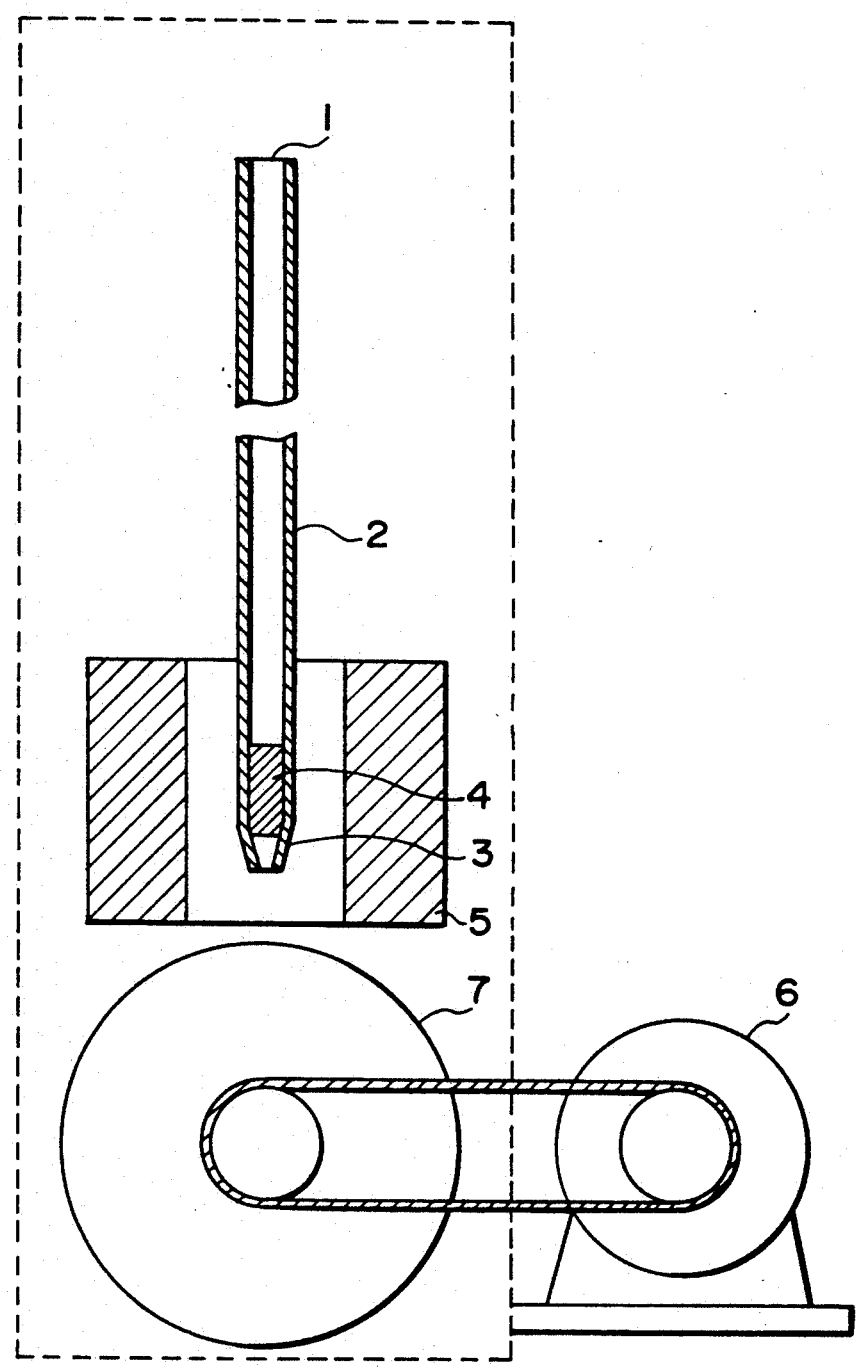

The present invention provides catalyst materials consisting of a metal or an alloy. More specifically, a first aspect of the present invention is directed to a catalyst material consisting of a metal selected from the valve metals, which have a high catalytic activity and retain their activity, or an alloy consisting of two or more elements of such valve metals. Another aspect is directed to a catalyst material consisting of an alloy consisting of at least one element selected from the above valve metals and at least one element selected from the group consisting of Ni and Co. Ni and Co further enhance the catalytic action of the catalyst materials. These catalyst materials not only have a very high catalytic activity but also a high resistance against halogen acids formed in the course of the decomposition of the flons. Therefore, such a high activity is not lowered during the catalytic reaction.

Table 1 shows the constituent elements and their content ranges of the catalyst materials of the present invention.

TABLE 1

| | Compositions of the Present Invention (at %) | |
|---|---|---|
| | Ti, Zr, Nb(*1) | Ni, Co(*2) |
| (1) | 100 | |
| (2) | Balance | 80 at % or less |

*1 The sum of at least one element selected from the group consisting of Ti, Zr and Nb
*2 The sum of at least one element selected from the group consisting of Ni and Co Metallic catalysts can be readily produced and among them there are many catalysts exhibiting a high activity for specific chemical reactions. However, there have arisen problems in using known catalysts for the decomposition of flons by their reaction with water. The most serious problem is that, even if the catalyst exhibits a catalytic activity at the initial stage of the decomposition of flons by the reaction with water, it is readily attacked by hydrofluoric acid and hydrochloric acid formed by the reaction and, thereby, dissolves into water or changes to inactive fluorides. Therefore, its catalytic activity can not be maintained.

On the other hand, the valve metals, which are the main components of the catalyst materials of the present invention, can maintain their catalytic activity during the catalytic reaction of flons with water, even if they are converted to fluorides. Metallic catalyst materials having an excellent performance for decomposition of flons to hydrofluoric acid, hydrochloric acid and carbon dioxide by the flons reaction with water and retaining their high activity, even in the formation of the above halogen acids, can be achieved by using the metal or alloy having the composition as specified above.

The reasons why each component and composition of the present invention are limited as above are described below:

Ti, Zr and Nb are the basic metals of the present invention and these valve metals do not lose their catalytic activity during the catalytic reaction of flons with water, even if they are converted to fluorides by action of hydrofluoric acid and hydrochloric acid resulting from the reaction. On the other hand, Ni and Co effectively act as a catalyst for the catalytic reaction of flons with water at the initial stage. However, these metals dissolve into water, which is one of reactants, due to the action of formed hydrofluoric acid and hydrochloric acid, and, thereby, their activity is gradually lost. As a result of the dissolution of Ni and Co, fluorides of Ti, Zr and Nb remain with a substantially increased surface roughness and their high catalytic activity for the catalytic reaction of flons with water can be retained.

Therefore, in order to form a catalyst surface of high surface roughness and, thereby, achieve a highly active catalytic surface, addition of Ni and/or Co is effective. However, when the total amount of at least one element selected from the group consisting of Ni and Co exceeds 80 at %, the amount of the basic component, i.e., at least one element selected from the group consisting of Ti, Zr and Nb, of the catalyst material of the present invention becomes insufficient and a high catalytic activity is hardly obtained. Therefore, the total of at least one element selected from the group consisting of Ni and Co should be limited up to 80 at %. However, in view of the advantageous effects as mentioned above, the addition of Ni and/or Co is effective and the preferred range is from 10 to 50 at %.

In order to examine the catalytic properties of a metallic material, it is preferable that a test specimen of the material be provided in a ribbon form. Therefore, most test specimens in the following examples were prepared by rapid quench solidification of liquid metallic materials. The rapid quench solidification process is widely used in the preparation of amorphous alloys. The apparatus used in the following examples is shown in the accompanying drawing. The portion enclosed by the dotted lines is evacuated and filled with an inert gas. In the FIGURE, a quartz tube 2 has a nozzle 3 at its lower end in the vertical direction, and raw materials 4 and an inert gas for preventing oxidation of the raw materials 4 are fed from an inlet 1 disposed at the upper end of the quartz tube 2. A heating furnace 5 is placed around the quartz tube, 2 so as to heat the raw materials 4. A high speed wheel 7 is placed vertically below the nozzle 3 and is rotated by a motor 6.

For the preparation of metallic material specimens in ribbon form, the raw materials 4 of the prescribed compositions are placed in the quartz tube 2 and the apparatus is evacuated up to about $10^{-5}$ torr. After the evacuated apparatus is filled with an inert gas, the raw materials 4 are melted by the heating furnace 5. The molten materials are ejected under the pressure of the inert gas and brought to collide against the outer surface of the wheel 7, which is rotated at a speed of 1,000 to 10,000 rpm, whereby metallic materials of the present invention can be obtained as a long thin plate, which may, for example, have a thickness of 0.1 mm, a width of 10 mm and a length of several meters.

Example 1

A raw alloy was prepared by argon arc melting of a mixture of metals so as to form Nb-40 at % Ni. After remelting of the raw alloy under an argon atmosphere, a metallic catalyst material was prepared in a ribbon form, about 0.02 mm thick, about 1 mm wide and about 6 m long, through rapid quench solidification of the remelted raw alloy by a rotating wheel method, using the apparatus as shown in the figure.

A reactor tube was prepared by placing 0.2788 g of the metallic catalyst material in a stainless steel tube of 8 mm inner diameter and placed in an electric furnace. CFC-12 flon was bubbled up through warm water and the CFC-12 flon containing water was passed through the reactor tube. The amounts of remaining CFC-12 flon and $CO_2$ at the outlet of the reactor tube were analyzed by gas chromatography. HF and HCl were dissolved in water and measured.

Table 2 shows the results thus obtained.

TABLE 2

| Reaction temperature °C. | Mass of CFC-12 flon converted by 1 g of metallic catalyst material during the reaction for 1 h* mg |
|---|---|
| 200 | 1.83 |
| 300 | 7.50 |
| 400 | 118 |
| 450 | 399 |
| 450 | 2160(steady value) |

*The reaction temperature was continuously elevated.

X-ray diffraction analysis of the metallic catalyst specimen after continuing the reaction at 450° C. for some time revealed that the surface of the specimen was covered with $NbF_3$. However, the catalytic activity of the specimen was retained without reduction, although the surface was covered with $NbF_3$. The reason why the steady value at 450° C. was very high as compared with the initial value is that the activity was further increased due to the loss of Ni from the surface of the specimen by reaction and conversion of Nb into $NbF_3$.

Example 2

For the production of catalyst materials containing Co and/or Ni, raw alloys, whose compositions are shown in Table 3, were prepared by argon arc melting of mixtures of metals. After remelting of the raw alloys under an argon atmosphere, alloy thin plates having a thickness of 0.01 to 0.05 mm, a width of 1 to 3 mm and a length of 3 to 20 m were prepared by rapidly quenching and solidifying the remelted alloys in accordance with the rotating wheel method, using the apparatus shown in the figure.

On the other hand, catalyst materials consisting of elemental Ti, Zr or Nb or alloy thereof were prepared as follows, using an amorphous alloy ribbon as a support. It had been confirmed from the preexamination that the amorphous alloy ribbon was low in catalytic activity even after being surface-roughened. Initially, the amorphous alloy ribbon was treated with HF to increase its surface roughness. Then, each of Ti, Zr, Nb and alloys thereof was sputtered onto the surface-roughened amorphous alloy ribbon to provide the catalyst materials.

Ni used as a comparative example was cut in a ribbon form of about 1 mm wide from a Ni thin plate having a thickness of 0.005 mm which were prepared by a 20-stage rolling operation.

A reactor tube was prepared by placing 0.2 to 0.5 g of the metallic catalysts thus obtained in a stainless steel tube of 8 mm inner diameter and was placed in an electric furnace.

CFC-12 flon was bubbled up through warm water and the resulting mixture containing CFC-12 flon and water was passed through the reactor tube. The amounts of remaining CFC-12 flon and $CO_2$ at the outlet of the reactor tube were analyzed by gas chromatography. HF and HCl were dissolved in water and measured.

Table 3 shows the results thus obtained.

TABLE 3

| Alloy (at %) | Mass of CFC-12 flon converted by 1 g of metallic catalyst materials for 1 h (g) Reaction temoerature: 450° C. |
|---|---|
| Ti | 1.22 |
| Ti-30Ni | 2.21 |
| Ti-40Ni | 2.56 |
| Ti-50Co | 1.97 |
| Ti-60Ni | 0.493 |
| Ti-50Ni-30Co | 0.114 |
| Ti-80Ni | 0.115 |
| Zr | 1.03 |
| Zr-40Ni | 1.25 |
| Zr-70Co | 0.133 |
| Zr-80Ni | 0.101 |
| Nb | 1.13 |
| Nb-30Co | 2.05 |
| Nb-40Ni | 2.16 |
| Nb-50Ni | 0.218 |
| Nb-60Ni | 0.186 |
| Nb-70Ni | 0.157 |
| Nb-80Co | 0.103 |
| Nb-80Ni | 0.104 |
| Ti-50Zr | 1.12 |
| Ti-50Nb | 1.18 |
| Zr-50Nb | 1.08 |
| Ti-25Zr-50Nb | 1.12 |
| Ti-30Zr-40Ni | 2.27 |
| Ti-20Zr-70Co | 1.05 |
| Ti-40Nb-30Co | 2.20 |
| Ti-10Nb-80Ni | 0.163 |
| Zr-40Nb-50Co | 1.75 |
| Zr-10Nb-30Ni | 1.28 |
| Ti-30Zr-30Nb-10Co-10Ni | 2.48 |

It was found from the above results that all of the metallic catalyst materials for decomposition of flons according to the present invention had a high activity and, thereby, decompose flons to hydrofluoric acid, hydrochloric acid and carbon dioxide by the flons reaction with water at low temperatures. Further, the catalyst materials of the present invention could retain their high activity.

In the case of using the Ni ribbon, the ribbon disappeared when the decomposition of the flon reached 2.05 g per 1 g of the Ni ribbon, because it dissolved into water by the attack of hydrofluoric acid and hydrochloric acid.

As described above, the metallic catalyst materials of the present invention have a very high catalytic activity for decomposition of flons at relatively low temperatures and can retain their high activity during the decomposition process, even if they are converted into fluorides.

Further, the highly active catalyst of the present invention can also be easily prepared by sputtering the above-specified metallic material onto an appropriate support and are very practical.

What is claimed is:

1. A method for decomposing chlorofluorocarbons comprising the step of reacting said chlorofluorocarbons with water at a temperature of 200° C. or higher and in the presence of a catalyst consisting of a metal selected from the group consisting of Ti, Zr, Nb and an alloy of at least two metals selected from said group.

2. The method of claim 1, wherein said catalyst consists of an alloy of at least two metals selected from the group consisting of Ti, Zr and Nb.

3. A method for decomposing chlorofluorocarbons comprising the step of reacting said chlorofluorocarbons with water at a temperature of 200° C. or higher and in the presence of a catalyst consisting of an alloy consisting of up to 80 atomic % of at least one metal selected from the group consisting of Ni and Co and the balance being at least one element selected from the group consisting of Ti, Zr and Nb.

* * * * *